Dec. 1, 1931. K. TERAMOTO 1,834,659
TROLLEY WIRE
Filed July 1, 1929
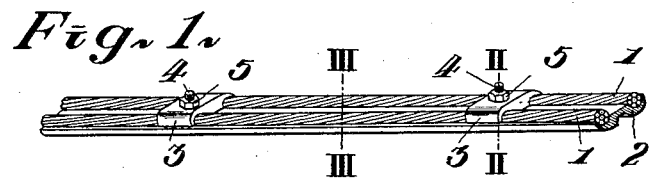
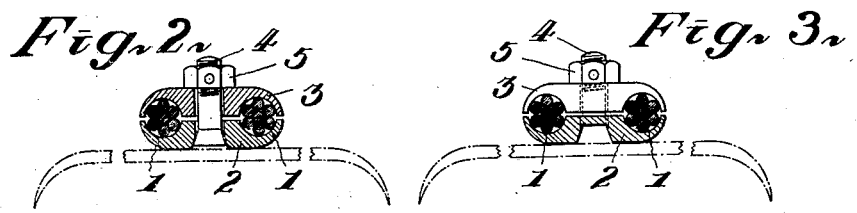
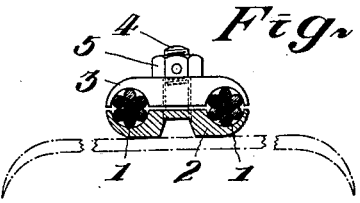
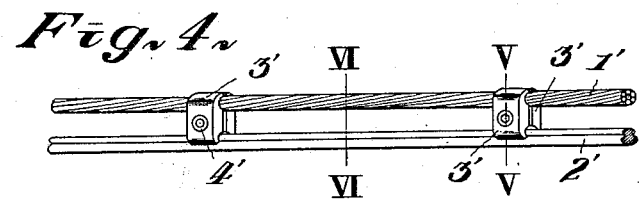
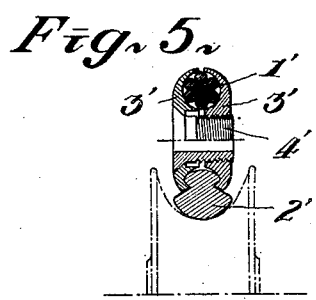
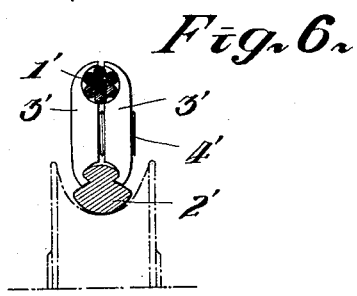
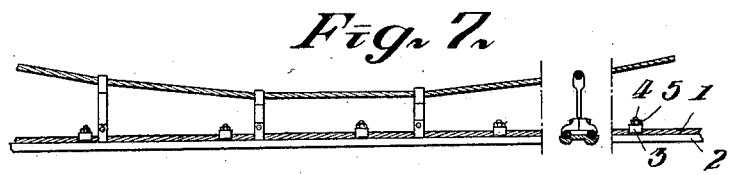
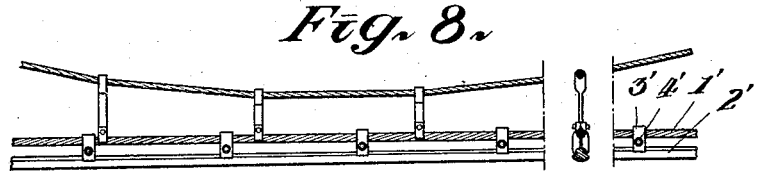
INVENTOR.
Kumatoshi Teramoto
BY
Langner, Parry, Card & Langner
ATTORNEYS Patented Dec. 1, 1931

1,834,659

UNITED STATES PATENT OFFICE

KUMATOSHI TERAMOTO, OF KAWABE-GUN, HYOGO-KEN, JAPAN, ASSIGNOR TO NIHON DENSEN SEIZO KABUSHIKI KAISHA, OF HYOGO-KEN, JAPAN

TROLLEY WIRE

Application filed July 1, 1929. Serial No. 375,307.

This invention relates to trolley wires such as are employed for electric tram cars or the like, and is more particularly concerned with flexible stranded trolley wires armoured by means of conductor sections arranged on the wires in such manner as to contact with current collectors, and has for its object to provide an armoured trolley wire whereby danger of break down of the trolley wire may be minimized, replacing of worn parts may be easily effected at a minimium of expense, and the current-carrying capacity of the wire may be increased.

In the solid trolley wires generally in use hitherto, a break of the wires may be caused by wear, enhancement of an initial slight flaw, an accidental fault, or undue increase of tension due to contraction on change of atmospheric temperature, the tensile strength of the wire being lowered by any of the above-mentioned causes. The present invention avoids or minimizes these disadvantages by employing flexible stranded trolley wires.

The wear on a trolley wire is by no means invariably uniform throughout its length, as a consequence of the variations of the lay of the land where the tramway is laid, the running conditions of the tram car and the wiring arrangements of the trolley wire, so that it frequently happens that the trolley wire will wear out and require replacing at several different parts. In the solid trolley wires hitherto employed, it is so difficult to replace a short length of the damaged part, that it has been customary to replace a section of from several hundred to a thousand or more feet, thus resulting in great expense in maintenance of the line. The present invention minimizes the wear by armouring the said flexible stranded trolley wire with contacting conductors of great hardness suitably formed so as to be arranged on wearing parts of the wire in contact with current collectors; and by this construction, replacing of the conductors, if necessary, may be easily effected at relatively small expense, the conductors being only ten meters or so in length.

The trolley wires hitherto employed, in general, have several drawbacks, (a) the lack of flexibility to withstand a very great shock in running of the tram car; (b) high wearing rate due to the sliding contact with the current collectors; (c) degradation of the wire due to its wiring tension being kept constant even when the wire is influenced by the above drawbacks; (d) difficulty of replacing the damaged wire and the consequent great expense, due to the necessity of maintaining the tension of the wire, the work being on a large scale. These drawbacks will occasionally cause various faults, such for instance, as breaking and grounding of the wire, so that the tram car will be unable to perform its services as a means of communication. The present invention will eliminate the above-mentioned drawback (a) by employing flexible stranded wires, the drawback (b) by adoption of contacting conductors of great hardness, the drawback (c) by preventing the said wire from directly contacting with current collectors, and the drawback (d) by adoption of the said contacting conductors, which may be easily replaced without disturbing the tension of the wire.

Further, according to the present invention, a trolley wire of great capacity may be employed, as the wire is of flexible stranded wire, while the solid trolley wire employed hitherto is limited in its size and consequent capacity owing to technical and wiring difficulties.

The invention is illustrated in the accompanying drawings in which:

Fig. 1 shows, in perspective, a constructional form of the armoured trolley wire embodying the invention, particularly adapted for use in conjunction with the pantograph collector.

Fig. 2 is a sectional view on the line II—II of Fig. 1, in enlarged scale.

Fig. 3 is a sectional view on the line III—III of Fig. 1, in enlarged scale.

Fig. 4 shows, in perspective, a modified constructional form of the armoured trolley wire particularly adapted for use in conjunction with the trolley wheel.

Fig. 5 is a sectional view on the line V—V of Fig. 4, in enlarged scale.

Fig. 6 is a sectional view on the line VI—VI of Fig. 5, in enlarged scale.

Figs. 7 and 8 show an application of the armoured trolley wire as shown in Figs. 1 and 4, respectively, to the catenary suspension construction.

Referring now to the drawings, in the constructional form as shown in Figs. 1, 2, 3, and 7, 1, 1 represent the trolley wires proper consisting of flexible stranded wires; while 2 is the contacting conductor constructed as shown in Figs. 1 and 2 from suitable metal of great hardness, and preferably being in sections of ten meters or so in length. The contacting conductor 2 is arranged to contact with the wearing parts of the wires proper and may be secured in suitable manner, as by means of several holding pieces 3 of the same cross section as the contacting conductor; bolts 4 and the nuts 5 embracing the wires and securing the elements 2 and 3 together.

In the modification as shown in Figs. 4, 5, 6 and 8, the trolley wire proper is represented by 1', and the contacting conductor 2' may have the cross section shown. The trolley wire proper 1' and the contacting conductor 2' are connected together by means of the opposite connecting members 3', 3' constructed as shown and a screw 4'.

It will be obvious that such armoured trolley wires may be applied to the catenary suspension in such manners as shown in Figs. 7 and 8.

Having now particularly described and disclosed the nature of my said invention and in what manner the same is to be performed, I claim:

1. An armoured trolley wire for electric tram cars comprising wires proper consisting of flexible stranded metal wire, and contacting conductor sections of short length and having a great hardness, which sections are arranged in substantially end to end relation to armour the wearing parts of the said wire proper, and to directly contact with a current collector.

2. An armoured trolley wire for electric tram cars as set forth in claim 1, in which there is but a single wire proper.

3. An armoured trolley wire for electric tram cars comprising main wires of flexible, stranded metal wire, and cooperating contacting conductor sections of short length extending continuously along the length of, and in physical contact with, the said main wires, the said sections being arranged in substantially end-to-end relation, to protect the wearing parts of the said wire proper, and to directly contact with a current collector.

In testimony whereof I have signed my name to this specification.

KUMATOSHI TERAMOTO.